US010348165B2

(12) United States Patent
Everhart, Jr. et al.

(10) Patent No.: US 10,348,165 B2
(45) Date of Patent: Jul. 9, 2019

(54) NOISE SUPPRESSION CIRCUIT (71) Applicants: NIDEC CORPORATION, Minami-ku, Kyoto (JP); NIDEC AUTOMOTIVE MOTOR AMERICAS LLC, Auburn Hills, MI (US)

(72) Inventors: Jon C Everhart, Jr., Rochester Hills, MI (US); Shakim S Qureshi, Warren, MI (US); John R Suriano, Auburn Hills, MI (US)

(73) Assignees: NIDEC CORPORATION, Kyoto (JP); NIDEC AUTOMOTIVE MOTOR AMERICAS LLC, Auburn Hills, MI (US)

( * ) Notice: Subject to any disclaimer, the term of this patent is extended or adjusted under 35 U.S.C. 154(b) by 241 days.

(21) Appl. No.: 15/207,848

(22) Filed: Jul. 12, 2016

(65) Prior Publication Data
US 2017/0104393 A1    Apr. 13, 2017

Related U.S. Application Data (60) Provisional application No. 62/238,379, filed on Oct. 7, 2015.

(51) Int. Cl.
*H02K 11/02* (2016.01)
*H02P 7/00* (2016.01)
*H04B 15/04* (2006.01)

(52) U.S. Cl.
CPC ............... *H02K 11/02* (2013.01); *H02P 7/00* (2013.01); *H04B 15/04* (2013.01)

(58) Field of Classification Search
CPC ........ H02K 11/00; H02K 11/01; H02K 11/02; H02K 11/024; H02K 11/026
See application file for complete search history.

(56) References Cited

U.S. PATENT DOCUMENTS

| 5,196,750 A | 3/1993 | Strobl | |
| 9,859,767 B2 * | 1/2018 | Lau | H02K 5/148 |
| 2003/0173848 A1 * | 9/2003 | Matsushita | H02K 5/15 |
| | | | 310/154.06 |

(Continued)

FOREIGN PATENT DOCUMENTS

| DE | 102013215143 A1 * | 1/2015 | ........... H02K 11/026 |
| EP | 2680411 A2 * | 1/2014 | ........... H02K 11/022 |

(Continued)

OTHER PUBLICATIONS

Gorges, Machine Translation of EP2680411, Jan. 2014.*

(Continued)

*Primary Examiner* — Quyen P Leung
*Assistant Examiner* — Eric Johnson
(74) *Attorney, Agent, or Firm* — Cantor Colburn LLP (57) ABSTRACT A noise suppression circuit for use with a noise source connected to ground may include a first capacitor having a first terminal and a second terminal, the first terminal of the first capacitor being connected to the noise source; and a first impedance element having a first terminal and a second terminal, the first terminal of the first impedance element being connected to the second terminal of the first capacitor and the second terminal of the first impedance element being connected to the ground.

10 Claims, 11 Drawing Sheets (56) References Cited

U.S. PATENT DOCUMENTS

| | | | |
|---|---|---|---|
| 2004/0012296 A1* | 1/2004 | Sakai | H01R 39/383 |
| | | | 310/239 |
| 2004/0114297 A1 | 6/2004 | Schmiederer et al. | |
| 2008/0217542 A1 | 9/2008 | Verma et al. | |
| 2011/0018377 A1* | 1/2011 | Zhao | H02K 11/024 |
| | | | 310/72 |
| 2012/0013226 A1 | 1/2012 | Stubner et al. | |
| 2013/0307380 A1* | 11/2013 | Zeng | H02K 11/026 |
| | | | 310/68 R |
| 2014/0053545 A1* | 2/2014 | Yahagi | F15B 15/00 |
| | | | 60/545 |
| 2014/0062266 A1 | 3/2014 | Qin et al. | |
| 2014/0159521 A1 | 6/2014 | Li et al. | |
| 2016/0190900 A1* | 6/2016 | Kremer | F02D 9/107 |
| | | | 123/337 |

FOREIGN PATENT DOCUMENTS

| | | |
|---|---|---|
| JP | B2793311 B2 | 9/1998 |
| JP | B2804989 B2 | 9/1998 |
| JP | 2002503077 A | 1/2002 |
| JP | 2002533046 A | 10/2002 |
| JP | 2015508252 A | 3/2015 |
| JP | B5683098 B2 | 3/2015 |
| JP | 2015512179 A | 4/2015 |
| JP | 2015106997 A * | 6/2015 |
| WO | WO 2012045507 A1 * | 4/2012 ............. F02D 9/107 |
| WO | 2014000800 A1 | 1/2014 |

OTHER PUBLICATIONS

Saito, Machine Translation of JP2015106997, Jun. 2015.*
Kuechen, Machine Translation of DE102013215143, Jan. 2015 (Year: 2015).*
Henry W. Ott "Noise Reduction Techniques in Electronic Systems" (Second Edition), John Wiley & Sons, U.S.A., 1988.
International Preliminary Report on Patentability corresponding to Application No. PCT/US2016/054398; dated Apr. 10, 2018.
International Search Report corresponding to Application No. PCT/US2016/054398; dated Dec. 22, 2016.
Jim Muccioli, "X2Y Attenuators, LLC DC Motor EMI Suppression", Presented at Ford Motor Company, Jul. 27, 2004, XP055328399, Retrieved from the Internet: www.x2y.com/publications/dcmotors/feb14-05.pdf.
Steve Weir, "Understanding Ferrite Beads and Applications" IPBLOX LLC, 2009, pp. 1-34.

* cited by examiner

NOISE SUPPRESSION CIRCUIT

CROSS REFERENCE TO RELATED APPLICATIONS

The present application claims priority under 35 U.S.C. § 119(e) to U.S. Provisional Patent Application No. 61/238,379, filed Oct. 7, 2015, the disclosure of which is incorporated herein by reference.

FIELD OF THE INVENTION

The present application relates to a noise suppression circuit for use with a noise source such as a motor.

BACKGROUND

Figure 1:
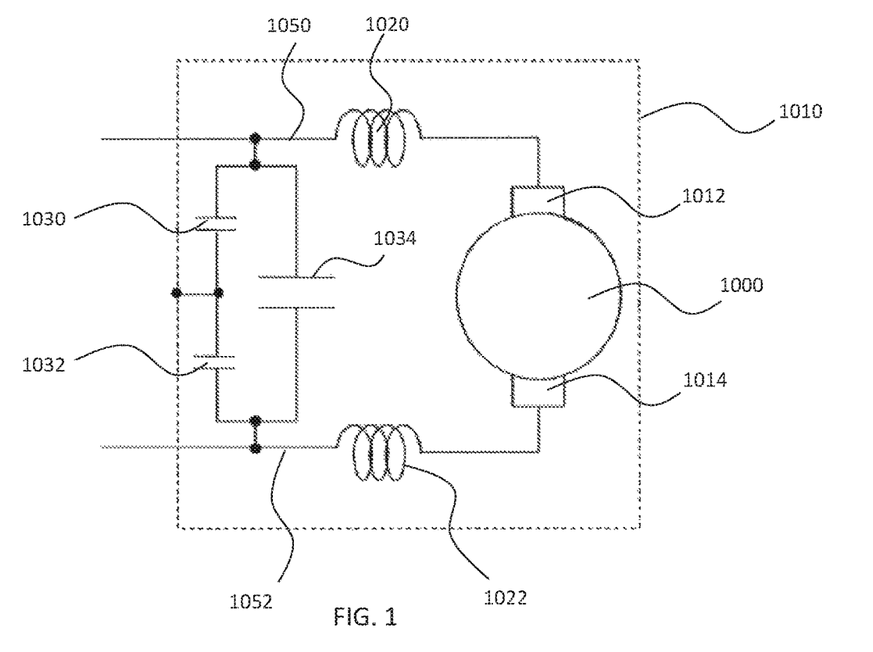
FIG. 1 is a diagram of a conventional noise suppression circuit.

In driving a motor, one concern is the generation of noise at certain frequencies. For example, FIG. 1 shows an example of a conventional noise suppression circuit. FIG. 1 shows a motor 1000 having brushes 1012, 1014. Inductors 1020, 1022 are connected to each of brushes 1012, 1014. An "X capacitor" 1034 connects the motor terminals 1050, 1052, and "Y capacitors" 1030, 1032 connect motor terminals 1050, 1052 to ground.

Figure 2:
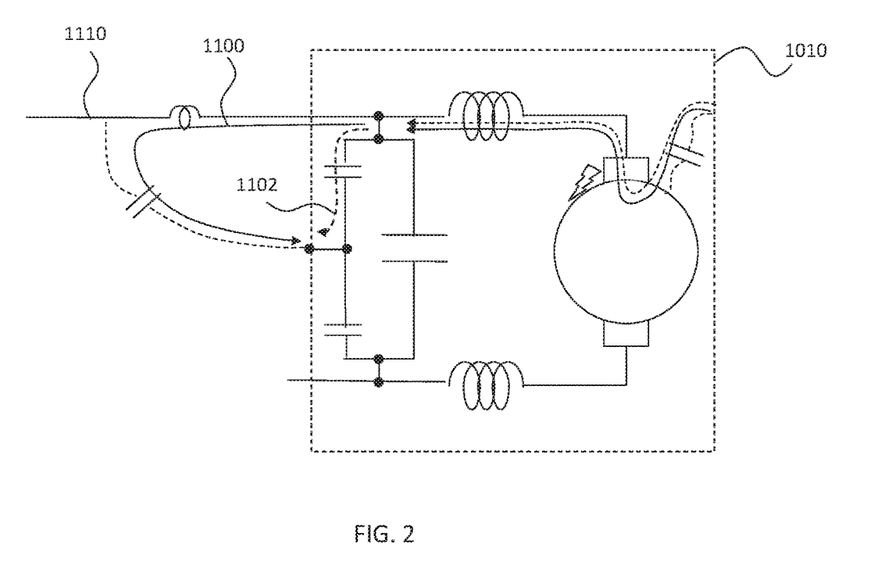
FIG. 2 is a diagram showing currents that can flow in a noise suppression circuit.

As seen in FIG. 2, radiated noise is produced due to RF current 1100 on the wiring harness 1110 resulting from capacitance between the harness 1110 and the motor housing 1010. At low frequencies, Y capacitors 1030, 1032 short circuit this voltage to suppress the noise (see current 1102 in FIG. 2). However, it has been found that at high frequencies (e.g., above 200 MHz), the connection to the motor housing 1010 results in a higher level of RF noise than would exist if there was no connection to the motor housing 1010. It is presumed that this higher level of noise is due to resonance of current 1100 and 1102.

Figure 3:
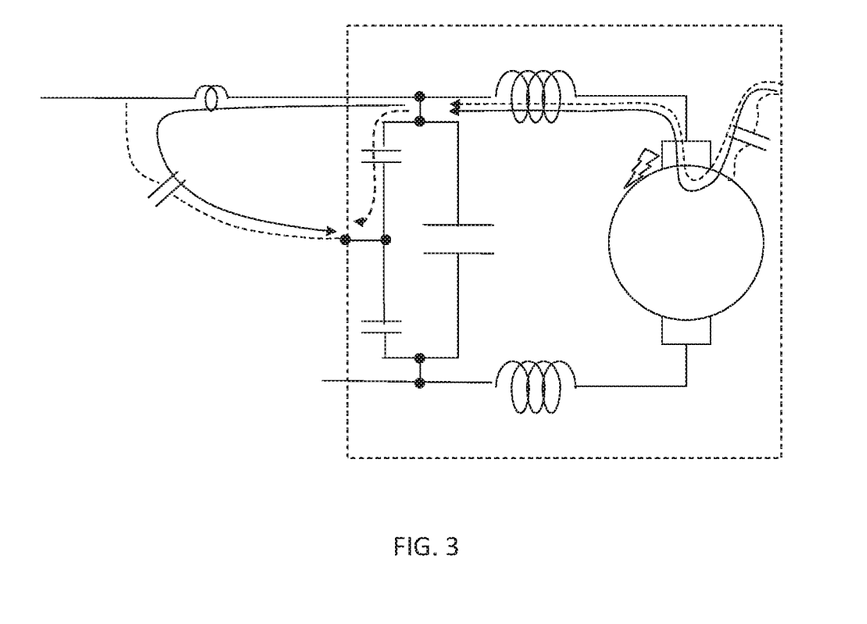
FIG. 3 is a diagram of a noise suppression circuit with Y capacitors removed.

Removing Y capacitors 1030, 1032 to eliminate the connection to the motor housing 1010 would remove this resonant radiated noise at high frequencies (see FIG. 3). However, the connection to the motor housing 1010 must be maintained to suppress low frequency noise.

Figure 4:
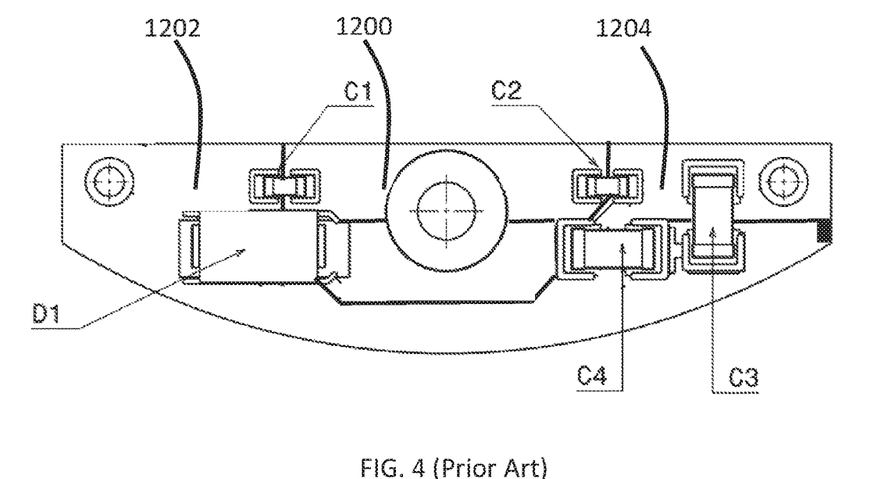
FIG. 4 is a conventional PCB trace layout for a noise suppression circuit.

Additionally, FIG. 4 shows an example of a conventional Printed Circuit Board (PCB) trace layout for a noise suppression circuit. For example, traces 1200, 1202, and 1204 in FIG. 4 all have large widths to keep impedance low. However, when large width traces are adjacent to each other in a PCB layout, there is a possibility of high frequency shorting paths occurring due to capacitance between the traces. This high frequency shorting path can have implications in noise suppression when trying to implement a solution to the problem of high frequency radiated noise.

It may be possible to use feed-through capacitors to help suppress noise in some applications. However, it is important to note that the size of feed through capacitors make them unsuitable for use in small motors. Additionally, the cost of feed-through capacitors is prohibitive for widespread use.

Thus, there is a need for a reasonable cost structure that maintains connection to the motor housing at low frequencies and also suppressing radiated noise at high frequencies, while accounting for the possible issues caused by high frequency shorting paths in a PCB layout with large trace widths.

SUMMARY

At least an embodiment of a noise suppression circuit for use with a motor may include a first brush, a second brush, and a motor housing, may include a first inductor having a first terminal and a second terminal, the first terminal of the first inductor being connected to the first brush; a second inductor having a first terminal and a second terminal, the first terminal of the second inductor being connected to the second brush; a first capacitor having a first terminal and a second terminal, the first terminal of the first capacitor being connected to the second terminal of the first inductor; a second capacitor having a first terminal and a second terminal, the first terminal of the second capacitor being connected to the second terminal of the second inductor; a third capacitor having a first terminal and a second terminal, the first terminal of the third capacitor being connected to the first terminal of the first capacitor and the second terminal of the first inductor, and the second terminal of the third capacitor being connected to the first terminal of the second capacitor and the second terminal of the second inductor; and one of a group consisting of a first ferrite bead having a first terminal and a second terminal, the first terminal of the first ferrite bead being connected to the second terminal of the first capacitor and the second terminal of the second capacitor and the second terminal of the first ferrite bead being connected to ground; and a first ferrite bead having a first and second terminal and a second ferrite bead having a first and second terminal; the first terminal of the first ferrite beading being connected to the second terminal of the first capacitor, and the second terminal of the first ferrite bead being connected to ground; and the first terminal of the second ferrite bead being connected to the second terminal of the second capacitor, and the second terminal of the second ferrite bead being connected to ground. The motor housing may be connected to ground.

At least an embodiment of a motor may include a first brush; a second brush; a motor housing; and a noise suppression circuit. The noise suppression circuit may include a first inductor having a first terminal and a second terminal, the first terminal of the first inductor being connected to the first brush; a second inductor having a first terminal and a second terminal, the first terminal of the second inductor being connected to the second brush; a first capacitor having a first terminal and a second terminal, the first terminal of the first capacitor being connected to the second terminal of the first inductor; a second capacitor having a first terminal and a second terminal, the first terminal of the second capacitor being connected to the second terminal of the second inductor; a third capacitor having a first terminal and a second terminal, the first terminal of the third capacitor being connected to the first terminal of the first capacitor and the second terminal of the first inductor, and the second terminal of the third capacitor being connected to the first terminal of the second capacitor and the second terminal of the second inductor; and one of a group consisting of a first ferrite bead having a first terminal and a second terminal, the first terminal of the first ferrite bead being connected to the second terminal of the first capacitor and the second terminal of the second capacitor and the second terminal of the first ferrite bead being connected to ground; and a first ferrite bead having a first and second terminal and a second ferrite bead having a first and second terminal; the first terminal of the first ferrite beading being connected to the second terminal of the first capacitor, and the second terminal of the first ferrite bead being connected to ground; and the first terminal of the second ferrite bead being connected to the second terminal of the second capacitor, and the second terminal of the second ferrite bead being connected to ground. The motor housing may be connected to ground.

At least an embodiment of a noise suppression circuit for use with a noise source connected to ground may include a first capacitor having a first terminal and a second terminal, the first terminal of the first capacitor being connected to the noise source; and a first impedance element having a first terminal and a second terminal, the first terminal of the first impedance element being connected to the second terminal of the first capacitor and the second terminal of the first impedance element being connected to the ground.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 5:
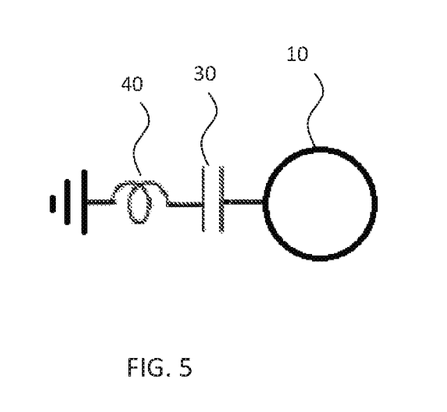
FIG. 5 is a diagram of a noise suppression circuit according to an embodiment.

FIG. 5 illustrates one embodiment of a noise suppression circuit. The noise suppression circuit may be used with a noise source 10, and may include a capacitor 30 and impedance element 40. Capacitor 30 has a first terminal and a second terminal, the first terminal of capacitor 30 being connected to the noise source 10. Impedance element 40 has a first terminal and a second terminal. The first terminal of impedance element 40 may be connected to a second terminal of capacitor 30, and the second terminal of impedance element may be connected to ground. Impedance element 40 may be a resistor, a low pass filter, a ferrite bead, or other suitable structure.

Figure 6:
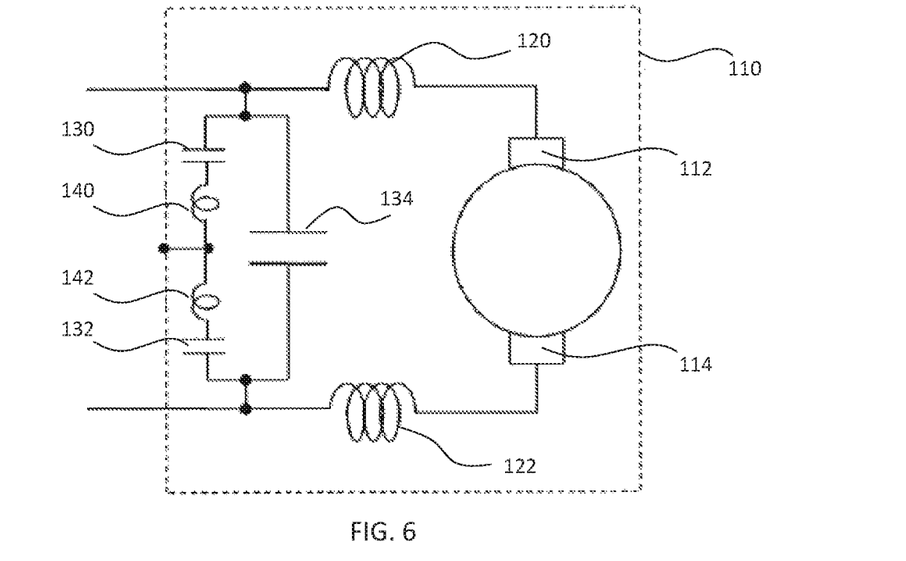
FIG. 6 is a diagram of a noise suppression circuit according to an embodiment.

FIG. 6 illustrates another embodiment of a noise suppression circuit. In FIG. 6, the noise source may be embodied as a motor comprising housing 110, first brush 112, and second brush 114. Housing 110 may be connected to ground. The noise suppression circuit may include a first inductor 120 having a first and second terminal, a second inductor 122 having a first and second terminal, a first capacitor 130 having a first and second terminal, a second capacitor 132 having a first and second terminal, a third capacitor 134 having a first and second terminal, a first ferrite bead 140 having a first and second terminal, and a second ferrite bead 142 having a first and second terminal. The first terminal of the first inductor 120 may be connected to first brush 112. The first terminal of the second inductor 122 may be connected to second brush 114. The first terminal of the first capacitor 130 may be connected to the second terminal of the first inductor 120. The first terminal of the second capacitor 132 may be connected to the second terminal of the second inductor 122. The first terminal of the third capacitor 134 may be connected to the first terminal of the first capacitor 130 and the second terminal of the first inductor 120. The second terminal of the third capacitor 134 may be connected to the first terminal of the second capacitor 132 and the second terminal of the second inductor 122. The first terminal of the first ferrite bead 140 may be connected to the second terminal of the first capacitor 130. The second terminal of the first ferrite bead 140 may be connected to ground. The first terminal of the second ferrite bead 142 may be connected to the second terminal of the second capacitor 132. The second terminal of the second ferrite bead 142 may be connected to ground. The addition of first ferrite bead 140 and second ferrite bead 142 will reduce the resonant frequency by adding inductance to the circuit, and will also reduce the magnitude of the resonance of currents 1100 and 1102 by adding resistance. In other words, the ferrite bead has both resistive and inductive properties.

Figure 7:
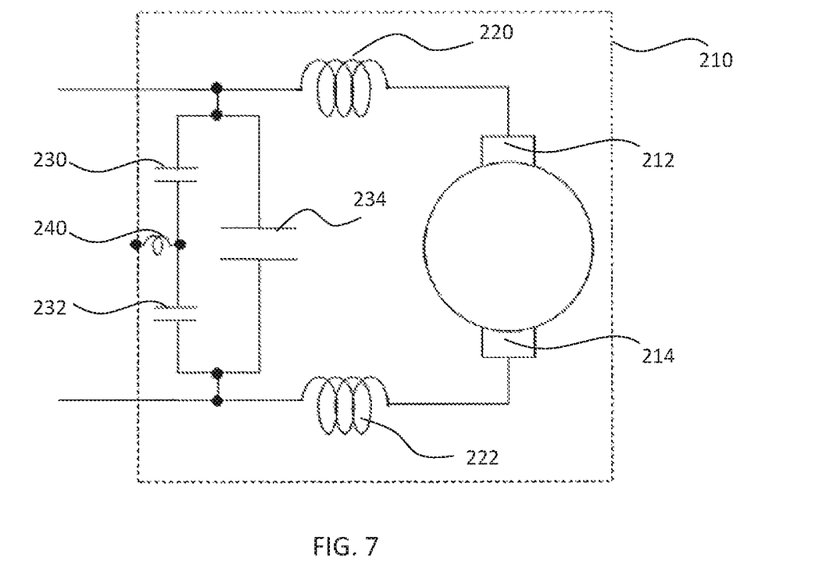
FIG. 7 is a diagram of a noise suppression circuit according to an embodiment.

FIG. 7 illustrates another embodiment of a noise suppression circuit. In FIG. 7, the noise source 10 of FIG. 5 may be embodied as a motor comprising first brush housing 210, first brush 212, and second brush 214. Housing 210 may be connected to ground. The noise suppression circuit may include a first inductor 220 having a first and second terminal, a second inductor 222 having a first and second terminal, a first capacitor 230 having a first and second terminal, a second capacitor 232 having a first and second terminal, a third capacitor 234 having a first and second terminal, and a first ferrite bead 244 having a first and second terminal. The first terminal of the first inductor 220 may be connected to first brush 212. The first terminal of the second inductor 222 may be connected to second brush 214. The first terminal of the first capacitor 230 may be connected to the second terminal of the first inductor 220. The first terminal of the second capacitor 232 may be connected to the second terminal of the second inductor 222. The first terminal of the third capacitor 234 may be connected to the first terminal of the first capacitor 230 and the second terminal of the first inductor 220. The second terminal of the third capacitor 234 may be connected to the first terminal of the second capacitor 232 and the second terminal of the second inductor 222. The first terminal of the first ferrite bead 240 may be connected to the second terminal of the first capacitor 230 and the second terminal of the second capacitor 232. The second terminal of the first ferrite bead 240 may be connected to ground. The addition of first ferrite bead 240 will reduce the resonant frequency by adding inductance to the circuit, and will also reduce the magnitude of the resonance of currents 1100 and 1102 by adding resistance. In other words, the ferrite bead has both resistive and inductive properties.

Figure 8:
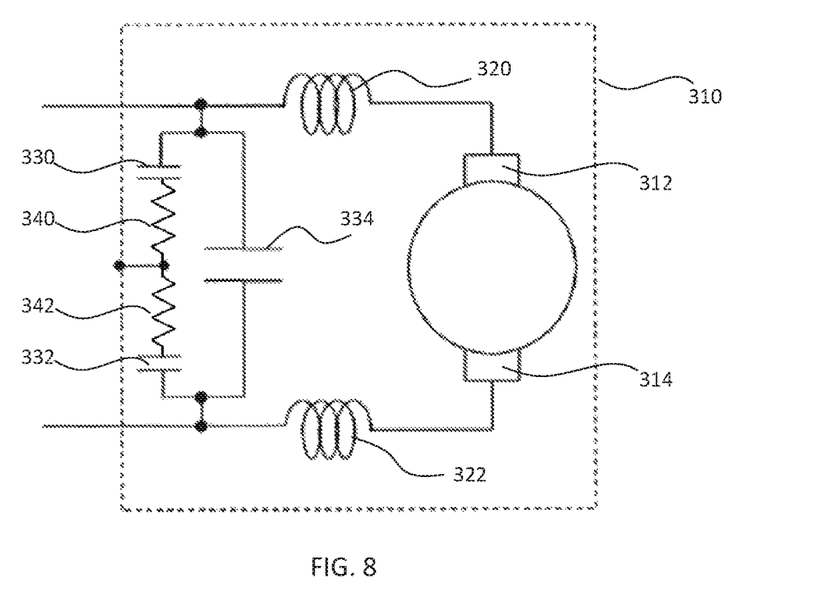
FIG. 8 is a diagram of a noise suppression circuit according to an embodiment.

FIG. 8 illustrates another embodiment of a noise suppression circuit. In FIG. 8, the noise source may be embodied as a motor comprising housing 310, first brush 312, and second brush 314. Housing 310 may be connected to ground. The noise suppression circuit may include a first inductor 320 having a first and second terminal, a second inductor 322 having a first and second terminal, a first capacitor 330 having a first and second terminal, a second capacitor 332 having a first and second terminal, a third capacitor 334 having a first and second terminal, a first resistor 340 having a first and second terminal, and a second resistor 342 having a first and second terminal. The first terminal of the first inductor 320 may be connected to first brush 312. The first terminal of the second inductor 322 may be connected to second brush 314. The first terminal of the first capacitor 330 may be connected to the second terminal of the first inductor 320. The first terminal of the second capacitor 332 may be connected to the second terminal of the second inductor 322. The first terminal of the third capacitor 334 may be connected to the first terminal of the first capacitor 330 and the second terminal of the first inductor 320. The second terminal of the third capacitor 334 may be connected to the first terminal of the second capacitor 332 and the second terminal of the second inductor 322. The first terminal of the first resistor 340 may be connected to the second terminal of the first capacitor 330. The second terminal of the first resistor 340 may be connected to ground. The first terminal of the second resistor 342 may be connected to the second terminal of the second capacitor 332. The second terminal of the second resistor 342 may be connected to ground. The addition of first resistor 340 and second resistor 342 will reduce the magnitude of the resonance of currents 1100 and 1102 (see FIG. 2).

Figure 9:
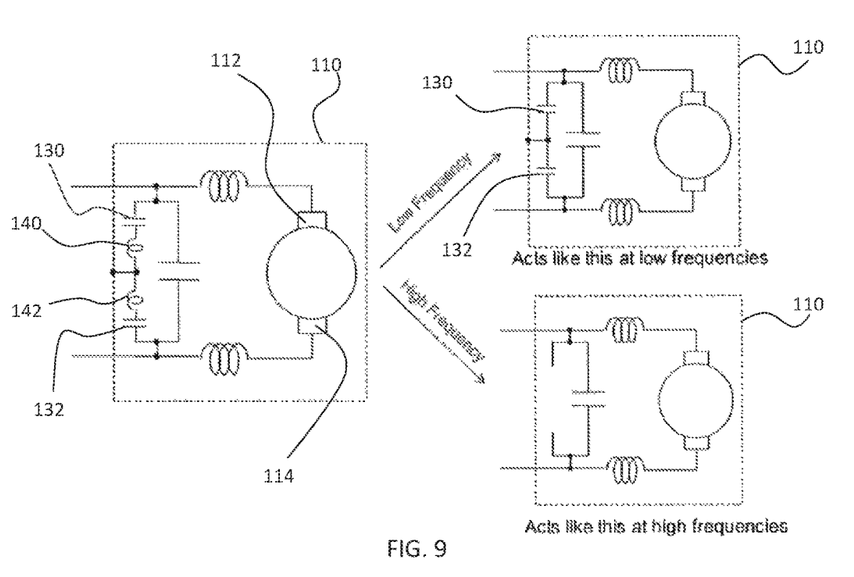
FIG. 9 is a diagram showing the effect of an embodiment of a noise suppression circuit at low frequency and high frequency.

FIG. 9 is a diagram showing the effect of embodiments of the noise suppression circuit. For example, at low frequencies, the ferrite beads 140, 142 will have relatively low impedance, such that the low frequency current can be shorted to the housing through capacitors 130, 132. In contrast, at high frequencies, the impedances of the ferrite beads 140, 142 becomes relatively high so as to effectively disconnect the circuit from the housing 110, thereby suppressing the high frequency noise generated by resonant currents.

Figure 10:
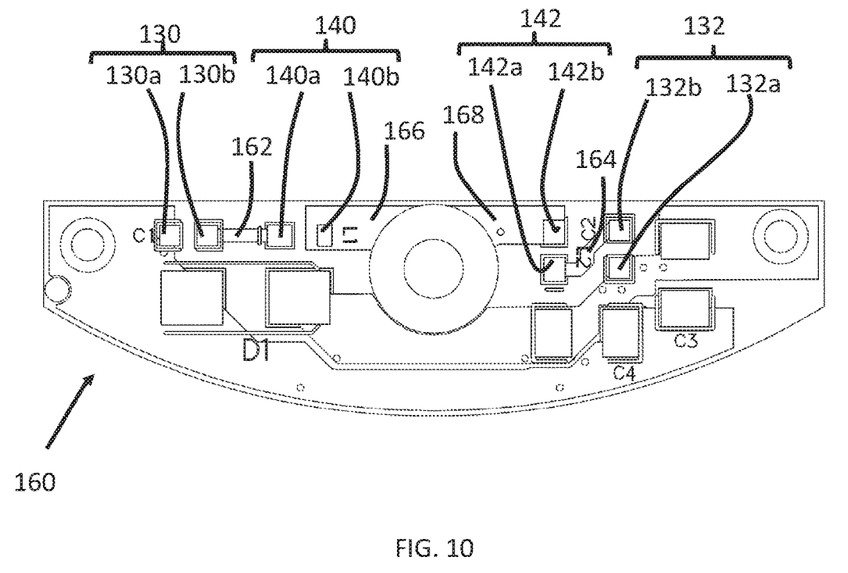
FIG. 10 is a PCB trace layout for a noise suppression circuit according to at least an embodiment.

FIG. 10 shows how the noise suppression circuit of FIG. 6 may be implemented on a circuit board 160. For example, first capacitor 130 may have first land 130*a* and second land 130*b* on the circuit board 160. Second capacitor 132 may have first land 132*a* and second land 132*b* on the circuit board 160. First ferrite bead 140 (i.e., first impedance element) may have first land 140*a* and second land 140*b* on the circuit board 160. Second ferrite bead 142 may have first land 142*a* and second land 142*b* on the circuit board 160. Second land 130*b* of first capacitor 130 may be connected to first land 140*a* of first ferrite bead 140 by first trace 162. Second land 132*b* of second capacitor 132 may be connected to first land 142*a* of second ferrite bead 142 by second trace 164. Second land 140*b* of first ferrite bead 140 may be connected to ground terminal 150 by third trace 166. Second land 142*b* of second ferrite bead 142 may be connected to ground terminal 150 by fourth trace 168.

As further seen in FIG. 10, a width of first trace 162 may be narrower than a width of a second land 130*b* of first capacitor 130 and narrower than a width of first land 140*a* of first ferrite bead 140. Additionally, a width of second trace 164 may be narrower than a width of a second land 132*b* of second capacitor 132 and narrower than a width of first land 142*a* of second ferrite bead 142. FIG. 10 further shows that a width of second land 140*b* of first ferrite bead 140 and a width of third trace 166 are wider than a width of first land 140*a* of first ferrite bead 140. Additionally, a width of second land 142*b* of second ferrite bead 142 and a width of fourth trace 168 are wider than a width of first land 142*a* of second ferrite bead 142. This arrangement of widths of the lands and traces helps to prevent high frequency shorting paths due to capacitance between lands.

Figure 11:
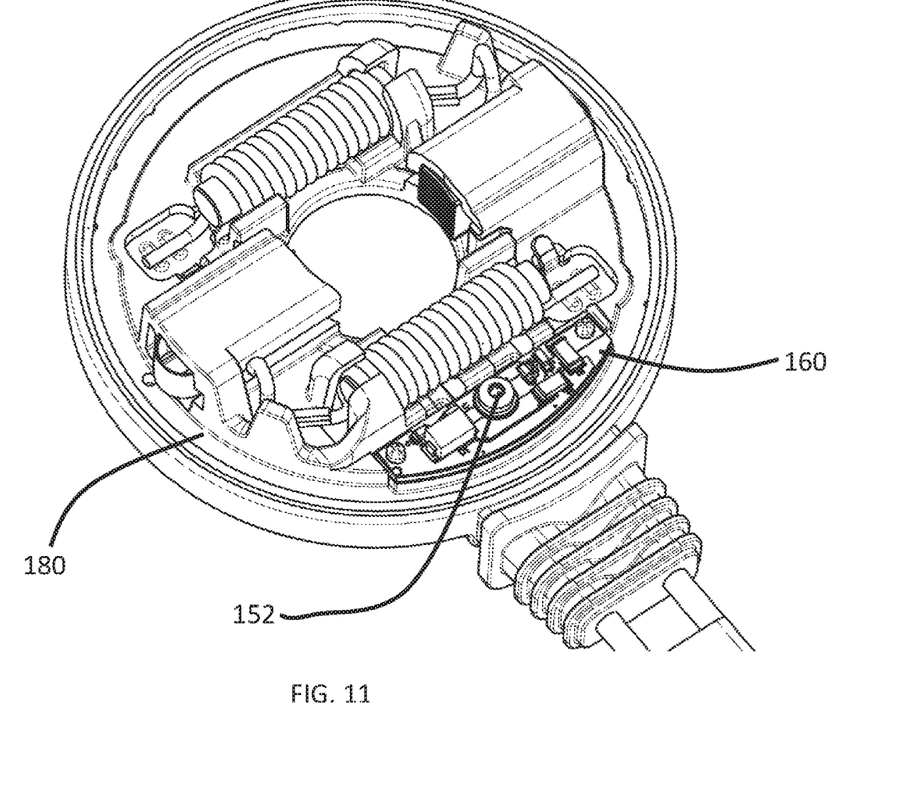
FIG. 11 shows the implementation of a noise suppression circuit with a motor according to at least an embodiment.

FIG. 11 shows that circuit board 160 may be fixed to a brush card 180 as part of a motor. Additionally, the ground terminal of circuit board 160 may be connected to ground via a screw 152. In other words, the second terminals of first ferrite bead (i.e., impedance element) and second ferrite bead may be connected to ground via screw 152. The screw 152 may be directly connected to a motor cover and therefore electric noise can escape outside the motor.

Thus, overall, the structures described above impart the benefits of suppressing noise at both low frequency and high frequency with the same circuit, while avoiding issues of high frequency shorting paths when implementing the circuit in a PCB layout.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A noise suppression circuit for use with a motor comprising a first brush, a second brush, and a motor housing, the noise suppression circuit comprising:
    a first inductor having a first terminal and a second terminal, the first terminal of the first inductor being connected to the first brush; and
    a first capacitor and a first ferrite bead provided in series between the second terminal of the first inductor and the motor housing, the motor housing being connected to ground.

2. The noise suppression circuit of claim 1, further comprising:
    a second inductor having a first terminal and a second terminal, the first terminal of the second inductor being connected to the second brush.

3. The noise suppression circuit of claim 2, further comprising a second capacitor and a second ferrite bead provided in series between the second terminal of the second inductor and the motor housing.

4. The noise suppression circuit of claim 3, wherein a first terminal of the first capacitor is connected to the second terminal of the first inductor, and a first terminal of the second capacitor is connected to the second terminal of the second inductor.

5. The noise suppression circuit of claim 4, further comprising:
    a third capacitor having a first terminal and a second terminal, the first terminal of the third capacitor being connected to the first terminal of the first capacitor and the second terminal of the first inductor and the second terminal of the third capacitor being connected to the first terminal of the second capacitor and the second terminal of the second inductor.

6. The noise suppression circuit of claim 4, wherein the noise suppression circuit provided on a circuit board.

7. The noise suppression circuit of claim 6, wherein a trace is provided between the second terminal of the first capacitor and the first terminal of the first ferrite bead; and
    a width of the trace is narrower than a width of a land for the second terminal of the first capacitor and a width of a land for the first terminal of the first ferrite bead.

8. The noise suppression circuit of claim 6, wherein the motor further comprises a brush card;

the circuit board is fixed to the brush card; and
the second terminal of the first ferrite bead is connected to ground via a screw.

9. A noise suppression circuit for use with a motor comprising a first brush, a second brush, and a motor housing, the noise suppression circuit comprising:
a first inductor having a first terminal and a second terminal, the first terminal of the first inductor being connected to the first brush;
a second inductor having a first terminal and a second terminal, the first terminal of the second inductor being connected to the second brush;
one of a group consisting of:
a first ferrite bead, a first capacitor, and a second capacitor, the first capacitor being connected between the second terminal of the first inductor and a first terminal of the first ferrite bead, and the second capacitor being connected between the second terminal of the second inductor and the first terminal of the ferrite bead, where a second terminal of the first ferrite bead is connected to the motor housing; or
a first capacitor and a first ferrite bead provided in series between the second terminal of the first inductor and the motor housing, and a second capacitor and a second ferrite bead provided in series between the second terminal of the second inductor and the motor housing; and
a third capacitor provided between the second terminal of the first inductor and the second terminal of the second inductor;
wherein the motor housing is connected to ground.

10. A motor comprising:
a first brush;
a second brush;
a motor housing; and
a noise suppression circuit comprising:
a first inductor having a first terminal and a second terminal, the first terminal of the first inductor being connected to the first brush;
a second inductor having a first terminal and a second terminal, the first terminal of the second inductor being connected to the second brush;
one of a group consisting of:
a first ferrite bead, a first capacitor, and a second capacitor, the first capacitor being connected between the second terminal of the first inductor and a first terminal of the first ferrite bead, and the second capacitor being connected between the second terminal of the second inductor and the first terminal of the ferrite bead, where a second terminal of the first ferrite bead is connected to the motor housing; or
a first capacitor and a first ferrite bead provided in series between the second terminal of the first inductor and the motor housing, and a second capacitor and a second ferrite bead provided in series between the second terminal of the second inductor and the motor housing; and
a third capacitor provided between the second terminal of the first inductor and the second terminal of the second inductor;
wherein the motor housing is connected to ground.

* * * * *